United States Patent [19]

Woodrum

[11] 3,921,144

[45] Nov. 18, 1975

[54] ODD/EVEN BOUNDARY ADDRESS ALIGNMENT SYSTEM

[75] Inventor: Luther J. Woodrum, Poughkeepsie, N.Y.

[73] Assignee: International Business Machines Corporation, Valhalla, N.Y.

[22] Filed: Dec. 26, 1973

[21] Appl. No.: 428,178

Related U.S. Application Data

[63] Continuation of Ser. No. 144,497, May 18, 1971, abandoned.

[52] U.S. Cl. .......... 340/172.5

[51] Int. Cl.² .......... G06F 9/20

[58] Field of Search .......... 340/172.5; 444/1

[56] References Cited

UNITED STATES PATENTS

| | | | |
|---|---|---|---|
| 3,483,528 | 12/1969 | Koerner | 340/172.5 |
| 3,576,436 | 4/1971 | Lindquist | 340/172.5 |
| 3,586,605 | 6/1971 | Gardner et al. | 340/172.5 |
| 3,683,163 | 8/1972 | Hanslip | 340/172.5 |
| 3,728,689 | 4/1972 | Edwards, Jr. | 340/172.5 |
| R27,119 | 4/1971 | Seeber, Jr. et al. | 340/172.5 |

*Primary Examiner*—Charles E. Atkinson
*Attorney, Agent, or Firm*—Bernard M. Goldman

[57] ABSTRACT

Computer handling a binary representation of an index for an entry in a computer table to determine if the index is an odd or even multiple of the number of addressable units (i.e. bytes, characters, or words) in the length of an entry in the table. A mask field is generated and used in making the odd or even determination by identifying the bit position of the lower-order one bit value in the binary representation of the entry length. If the index is determined to be an odd multiple, an adjustment is made to the number of addressable units in the index prior to its use in generating a next index, so that the adjusted index is an even multiple.

No adjustment is provided to the current index if it is determined to be an even multiple.

When used within a binary search, the address generated to represent the next index will be boundary aligned to the beginning of a table entry. The next index is generated by a right shift (i.e. a shift of one bit position toward its lowest order bit) of the adjusted binary number representation of the current index. The even multiple adjustment assures that no remainder can be generated by a shift operation, which provides a remainderless binary divide-by-two.

2 Claims, 9 Drawing Figures

INVENTOR
LUTHER J. WOODRUM

BY Bernard M. Goldman

ATTORNEY (REMAINING TABLE PORTION)

"OR"MASK HARDWARE

ODD/EVEN BOUNDARY ADDRESS ALIGNMENT SYSTEM

This is a continuation, of application Ser. No. 144,497 filed May 18, 1971 now abandoned.

This invention relates generally to computer addressing methods and means, and particularly to a novel computer method and means for accessing the first addressable unit in any entry in a computer-represented table.

Prior art computer techniques include a binary search method for finding the index of a next entry in a table to be compared with a search argument. The prior techniques have found the index by multiplying the number of addressable units per table entry by a result of a binary shift division by two. This computer multiply operation obtained automatic boundary alignment in the generation of each address (index) to be searched in the table. An example of such prior binary search techniques is found in a book entitled "Automatic Data Processing" by F. P. Brooks, Jr. and K. E. Iverson published in 1963 by John Wiley and Sons on page 336, as well as in numerous other books and publications, and by numerous uses in prior and present computer systems whenever the entries each had a number of addressable units (i.e. bytes, character's or words) which were not equal to an integral power of two.

Objects of the subject invention are to provide an address generation method and means which:

a. operates faster within a computer environment handling a binary search than prior methods;

b. avoids any multiplication operation in determining a next index;

c. operates on tables having any entry size, i.e. any number of addressable units;

d. operates on tables with any number of entries;

e. provides the next index in a binary search by operating only on the number of addressable units remaining to be examined in the table, without any multiplication operation on the current index value;

f. determines if the index of an entry in a table is even or odd from its binary representation;

g. determines the odd/even boundary alignment of an index address in a table;

h. determines from a computer registered binary representation of a number whether that number is an even or odd multiple of another number represented in the computer store;

i. generates a next index by a novel technique.

The subject invention operates under computer control on the binary representation of the number of addressable units in a computer table to be scanned during each next iteration of a search process. An "addressable unit" is the unit used within a computer hardware system to address its storage device in which program execution takes place. For example, the "addressable unit" in the IBM S/360 or S/370 computer system is the "byte" comprising eight bits, and in the IBM 7090 computer system it is the "word" comprising 36 bits. Every computer system, whether IBM or not, has an "addressable unit" which its executable programs must use. However any program can within itself define its own addressed unit by using indexing, and the program addressed unit is the index increment usually provided in an index register. The index increment specified for a program must use an integral number of the system's "addressable units." The invention uses a unique mask technique to determine if the current table index is an odd or even multiple of the entry length in addressable units (i.e. bytes, characters, or words). If the index is determined to be an odd multiple, an adjustment is made to the number of addressable units prior to the generation of the next index, so that the address generated to represent the next index will be boundary aligned to the beginning of a table entry.

The mask provided by the invention can be generated in a simple manner as a sole function of the length of each entry in addressable units. The mask represents the position of the lowest-order one bit in the binary representation of the entry length. Once generated, a mask can be used over and over again for searches of any table having the same entry size, regardless of the number of entries in the table. Hence masks can be stored for future use. The invention uses a mask dynamically during a search by applying it to the current binary number of addressable units in a portion of a table remaining after each iteration of the search. The mask determines if the binary representation of the index to the current table entry is an odd or even multiple of the number of address units per entry. During a single search operation, the mask may find some indices are even multiples and others are odd multiples. If the current index is an odd multiple, an adjustment is made to the remaining number of addressable entries by subtracting from it the entry length in addressable units. The next index is generated by a right shift of the adjusted binary number representation, so that no remainder occurs in the truncated bit, i.e. a shift by one toward its lower order bit position. If the index is an even multiple, no adjustment is made to the current number of addressable units; and the next index is generated by a right shift of the binary number representation without any remainder. In each case, the index of the next entry to be examined in the search is the machine representation of the binary number remaining after the right shift.

The foregoing and other objects, features, and advantages of the invention will be apparent from the following more particular description of the preferred embodiments of the invention, as illustrated in the accompanying drawings.

Figure 4A:
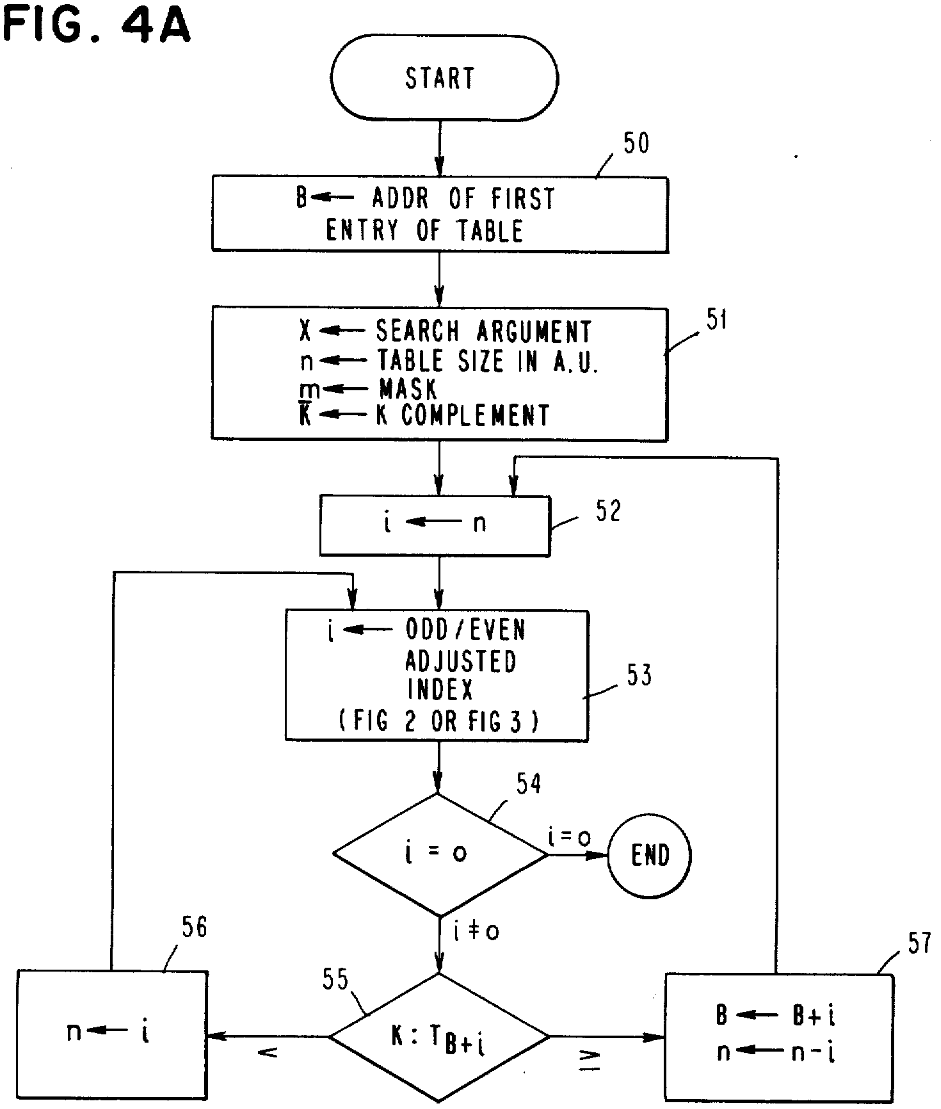
Figure 4B:
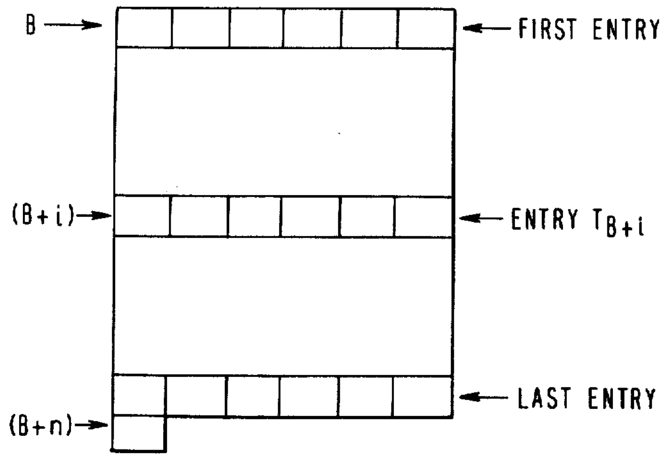

FIG. 4A provides a binary search method using the inventive techniques disclosed herein; and FIG. 4B illustrates the parameters for a remaining table portion found during a binary search.

Figure 5:
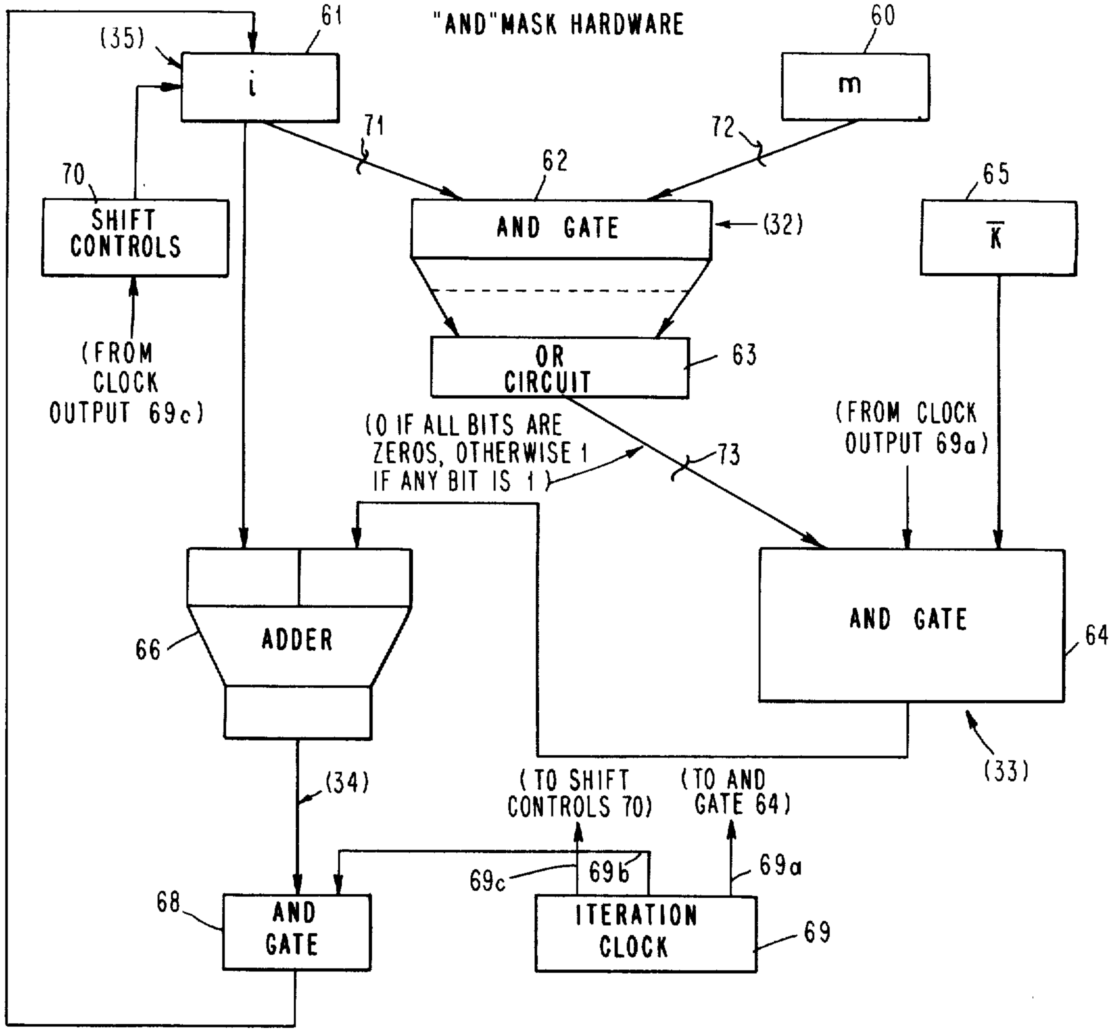
Figure 6:
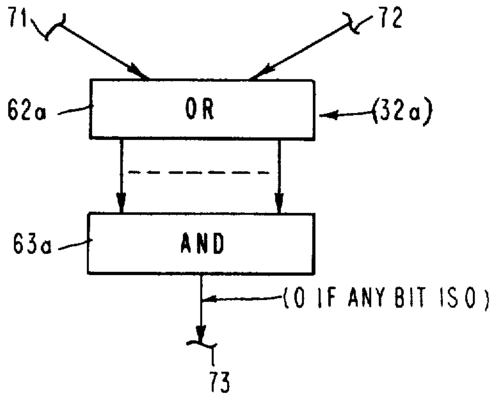

FIGS. 5 and 6 provide hardware embodiments of the invention using AND and OR masks respectively.

Figures 0, 1A, 1B:
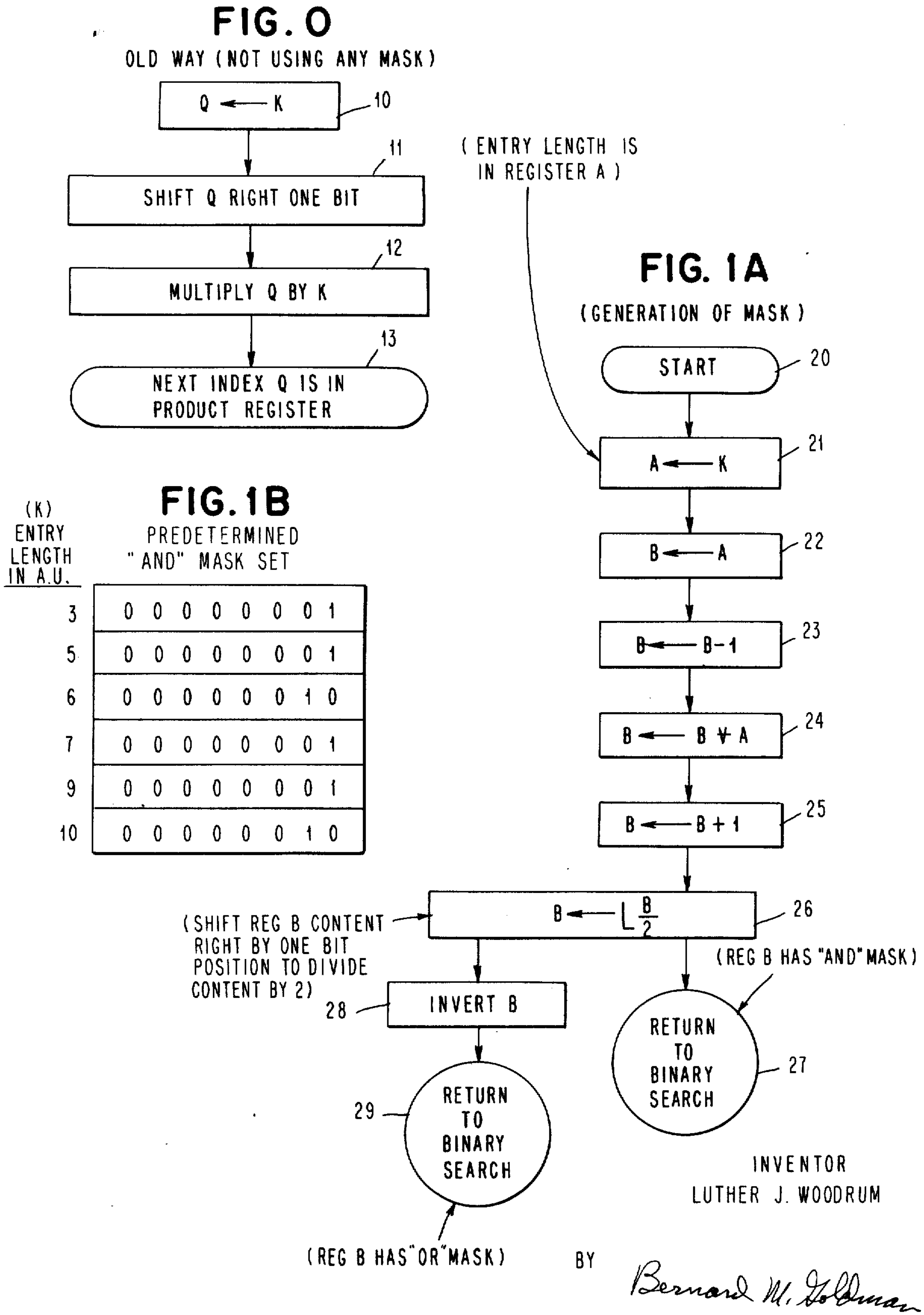
FIG. 0 illustrates a prior art technique for determining the index of a next entry in a table being binary searched.
FIG. 1A represents a method for generating a mask field of the type required by the subject invention.
FIG. 1B shows a stored array of mask fields for future use.

The prior art technique in FIG. 0 illustrates a computer method currently in use to obtain the index of the next entry to be examined during a binary search of a table having K number of entries. Step 10 places a representation of the number K into a register Q found in the computer system.

Then step 11 shifts the binary content in register Q by one bit position toward its low order end, i.e. toward the right; this effectively represents a binary divide-by-two operation which leaves a quotient in register Q, for which any remainder is lost. The resulting quotient in register Q represents the index for the next entry to be examined in the binary table; which entry is approximately in the middle of the table portion to be examined. Then step 12 uses a multiply feature on the computer machine to multiply the value in register Q by the number K of addressable units in each table entry, and it places the product (KQ) in register Q. The resulting content of register Q now contains the address (i.e. the index) of the entry to be next addressed during the binary search. If each entry contains more than one addressable unit (i.e. word, byte or character), the index in register Q is the address of the initial addressable unit in the entry being addressed, i.e. the entry's left-most or highest-order addressable unit.

The slowest component in steps 10–13 in the prior method is multiplication step 12, because the execution of a multiply instruction is significantly slower than most other instructions in a computer system. For this reason, the multiplication step is avoided by the invention (without adding a corresponding operation) to obtain a significant increase in the speed of operation of a binary search in a computer system.

A masking field is a basic item used by the subject invention. FIG. 1A provides a method for generating masks of the type found with the subject invention. The purpose of the mask field is to identify the bit position which contains the lowest order 1 bit in a binary representation of the entry length in addressable units. Therefore the most important bit in the mask field is the bit at the bit position representing the lowest order 1 bit in the binary representation of the entry length. The bits at lower bit positions in the mask field are used to identify the position of the most important bit by being of the opposite bit value. Thus if the most important bit is a 1, each lower order bit is a 0, or vice-versa. The higher order bits also can be used in the same manner to identify the most important bit position. In the AND and OR mask examples given herein, both the higher order bits and the lower order bits in a mask have opposite values from the bit at the most important bit position to identify it. However it is apparent that all that is really needed in the mask configuration is to identify the most important bit position.

The mask indicates whether the current entry in the table being searched has an odd or even index; this odd/even characteristic is determined before the index is generated for the next entry. The knowledge of the odd/even condition of the current entry's index is a basic feature found in the subject invention.

When the operation in FIG. 1A is started, step 21 transfers into a register A the binary representation K of the number of addressable units in each entry in the table, i.e. the entry length. Then step 22 transfers the content of register A into register B; and step 23 subtracts one from the content of register B to provide a new content. Next step 24 Exclusive-OR's the binary contents of registers A and B and leaves the binary result in register B. Step 25 adds one to the content of register B. Finally step 26 shifts the content of register B by one bit position toward its lower order end (i.e. a right shift), which performs a binary divide by two on the register content. The form of the binary result in register B is all zeros except for a single one bit at the bit position corresponding to the lowest-order non-zero bit in the binary representation of the entry length K.

The mask field provided in register B at the end of the method in FIG. 1A is an AND mask. The OR mask is obtainable by complementing (i.e. inverting each bit in) the AND mask field.

After a mask is generated in register B by the method in FIG. 1 for a particular entry length K, the mask may be recorded in a field and need not again be generated by a binary search. FIG. 1B illustrates a collection of masks saved for future use; respective fields are labeled with the entry length represented by the mask in that field. Thus once a mask has been generated for a particular entry length, it is not thereafter necessary to again generate the mask for the same entry length K, since it can be called upon and be reused whenever needed. In some practical situations, it may be simpler to regenerate the mask by the rather simple process in FIG. 1A, rather than permanently storing a plurality of mask sizes in a table such as in FIG. 1B, and fetching the proper size mask from that table when required.

Figure 2:
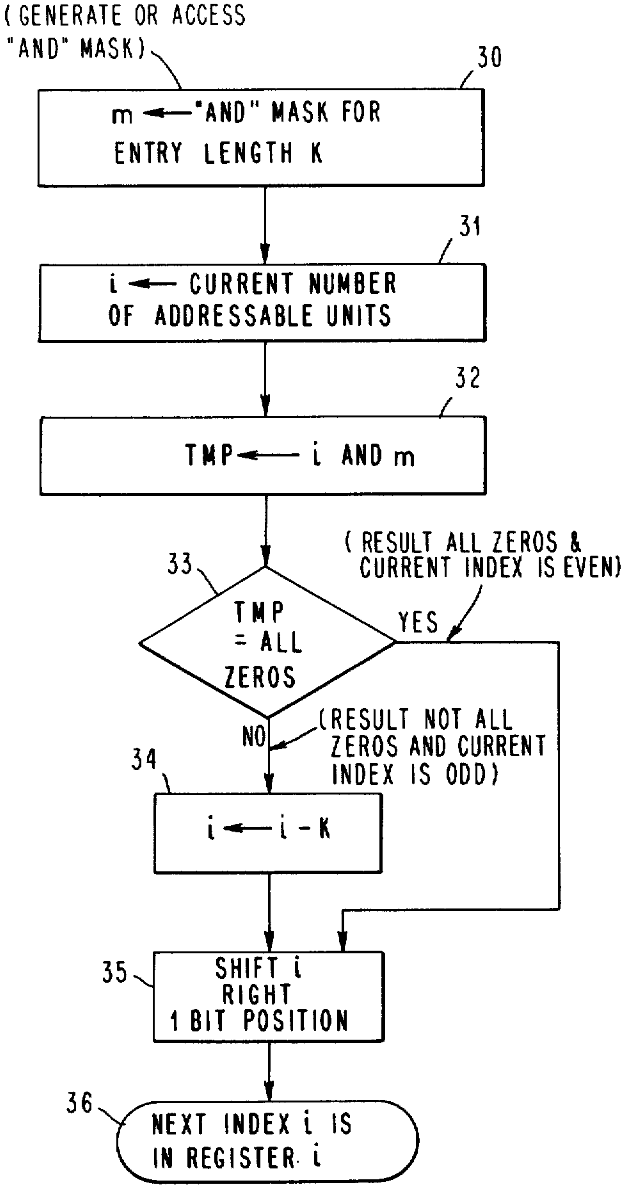
FIGS. 2 and 3 show different method embodiments of the invention using an AND mask field and an OR mask field, respectively.

FIG. 2 illustrates the operation of the invention with an AND mask field, which is used to determine if a current index represented as an address in addressable units is an odd or even multiple of the table entry length represented in the same addressable units. The mask finds a particular bit position in a binary representation of the current index represented in addressable units in binary member form. The 1 or 0 value of the bit found in the index by the mask respectively signals whether the index is an odd or even multiple of the entry length K.

Step 30 obtains the required AND mask for the given table's entry length K (in addressable units). Step 30 obtains the mask either from the table in FIG. 1A or generates it with the method in FIG. 1B.

Step 31 sets the content of a register i to represent the current number of addressable units remaining to be binary searched in the table; initially i represents the total number of addressable units (bytes) in the table.

Step 32 AND's the bits in the AND mask with the content of register *i*. The result of AND step 32 is put into a register TMP. The result of the AND'ing operation reveals whether the bit in register *i* at the single 1 bit position in the mask has a 1 or 0 value. This reveals whether the index to be generated will be odd or even. Since all bits in the mask are 0's except the single 1 bit, the result of the AND operation in register TMP has either all zeros, or a single one bit with the remaining bits being zeros.

Step 33 determines if the current index is an odd or even multiple of the entry length, in order to determine whether an adjustment should or should not be made to the content of register *i* from which the next index will be generated by step 35. To do this, step 33 tests the content of register TMP to determine if every bit in it is a zero, or not, as a result of the AND'ing operation by step 32. If all bits are zeros, the index of the next entry to be addressed is even. However if step 33 finds a one bit at any location in register TMP, the index of the next entry to be addressed has an odd value. The YES exit from step 33 is taken if register TMP contains all zeros (i.e. the current content of register *i* is an even multiple). Then no adjustment is required to the current content in register *i*; and step 35 is directly entered to generate the next index from its unadjusted content.

However the NO exit is taken if step 33 found a one bit anywhere in register TMP (i.e. the current index is an odd multiple), and therefore step 34 is entered to provide an adjustment in the current content of register *i*. The adjustment is done by subtracting from it the value of K (i.e. the number of addressable units per entry), so that an even multiple value remains in register *i*; and the adjusted result is placed in register *i*.

Step 35 then generates the next index by shifting the content of register *i* to the right by one bit position in the manner previously explained for this step to truncate the lowest-order bit existing before the shift in register *i*. The resulting content in register *i* represents the index for the next entry to be examined in the remaining portion of the table being searched.

Figure 3:
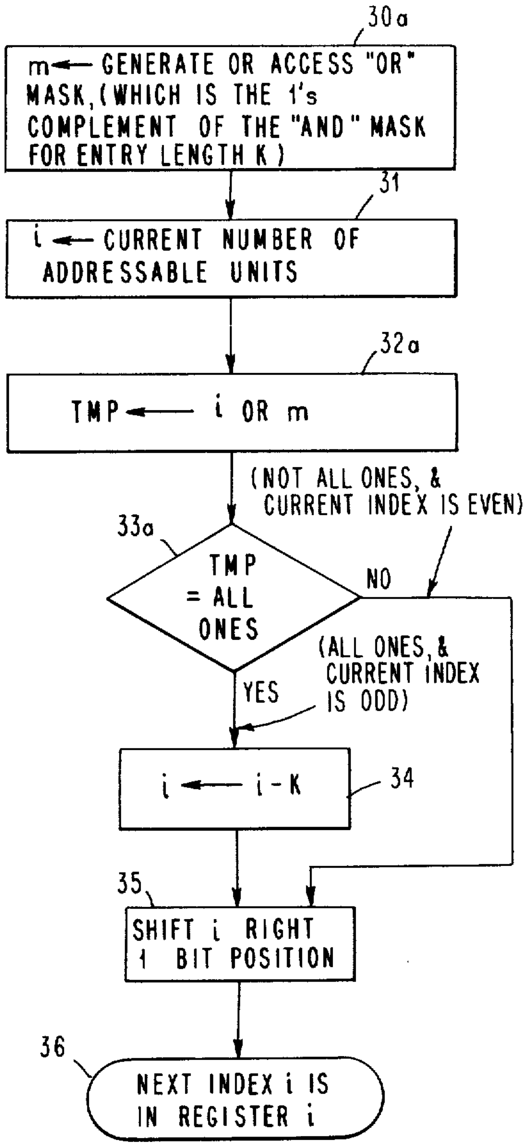

FIG. 3 illustrates the invention using an OR mask instead of an AND mask. It can be seen that (a) the steps in FIG. 3 directly correspond with the steps in FIG. 2, and (b) corresponding steps are identical except for steps 30*a*, 32*a* and 33*a*, which operate to provide an OR function, rather than the AND function found in FIG. 2. Thus step 30*a* loads register *m* with an OR mask which is a function of the entry length K in the current table being handled by the computer system (by accessing the mask from a table similar to that shown in FIG. 1A, or by generating it with a method similar to that shown in FIG. 1B). (As previously mentioned, the OR mask is directly related to the corresponding AND mask for the same entry length by being the one's complement of that AND mask.)

Step 32*a* OR's the current content in register *i* with the mask field currently found in register m and provides the OR'ed result in register TMP. Step 33*a* then tests the resulting content in register TMP to determine if it contains all ones, or a single zero, as a result of the OR operation. If it contains all ones, the current index is an odd multiple; but if it does not contain all ones (i.e. it contains a zero in any bit position), the current index is an even multiple.

The remaining steps in FIG. 3 are the same as described for FIG. 2 with the same reference numbers.

FIG. 4A illustrates a binary search method using the subject invention. When the binary search is started, the address of the first entry in the table is placed in a register B. This step corresponds to placing the address of the first entry into a base register, and this first entry will have an index of zero in the table. Step 51 continues the initialization process in preparation for the binary search by inserting a search argument into a register X; the table size in addressable units (A.U.) in a register *n* (the A.U. for example will be bytes in an IBM S/360 or S/370 computer system); the mask to be used is placed into a register m; and the twos-complement of the entry length value K in addressable units is placed into register $\overline{K}$ to assist the computer subtraction of the value K in a hardware adder.

Step 52 transfers the table size from register n into register i in which the manipulations of the index will take place to determine the address of each next entry to be accessed in the table during the binary search. Step 52 is entered which begins the binary search iteration process. Then step 53 is entered; it includes either the method previously described with respect to FIG. 2, or the method shown in FIG. 3, to obtain the next index value required by the binary search. In FIG. 4A, the beginning of step 53, the content in register *i* is in a binary form that represents the number of addressable units in the remaining table portion being examined, which initially is the entire table. At the end of step 53, register *i* contains the index of the next entry in the remaining table portion to be examined. The index of this next entry is relative to the beginning of the remaining table portion.

Next step 54 examines the content of register *i* to determine when the process should be ended. When step 54 indicates all zeros exist in register *i*, a table portion having only a single entry remains.

If the content of register *i* is not all zeros, a table portion of more than one entry remains to be examined which may have the form shown in FIG. 4B. Step 55 is entered which compares the content of the entry at index B + *i* (i.e. entry $T_{B+i}$) in the remaining table portion with the search argument in register X. If the search argument in register X is less than $T_{B+i}$, the entry being sought can only be in the upper half of the table portion being searched i.e. between addresses B and (B + *i*); and step 56 is entered. Step 56 transfers the current value of register i to register n to represent the addressable units in the remaining portion of the table to be searched in the next iteration, which will find (via step 53) an index used to locate the approximately central entry (i.e. $T_{B+i}$) in that remaining table portion. The beginning address B for the remaining table portion is not changed when step 56 is entered. Then step 53 begins the next iteration for finding and examining the next entry $T_{B+i}$ in the binary search in the remaining table portion.

On the other hand if step 55 finds the content of register X is equal to or greater than $T_{B+i}$ the search argument is in the bottom half of the table, i.e. between addresses (B + *i*) and (B + *n*). Then step 57 is entered to adjust the base value B to address the beginning of the remaining table portion to be scanned; this is done by adding the index *i* into register B, i.e. B ← B + *i*. The content of register *n* is changed by subtracting from it the content of register *i* so that register n contains the number of addressable units in the remaining table portion, i.e. register *n* gets *n* − *i*. Then a branch is taken back to step 52 to begin the next iteration which finds and examines the entry $T_{B+i}$ at approximately the center of the remaining table portion.

The process reiterates until only one entry $T_{B+i}$ exists in the remaining table portion, which is indicated by step 54 finding that the index has become zero. The content of register B then contains the address of the location of the correct entry in the table, if one exists.

The following TABLE shows a table which is binary searched by the search argument "NEVADA":

TABLE

| INDEX | 0 | 1 | 2 | 3 | 4 | 5 |
|---|---|---|---|---|---|---|
| 0 | A | R | M | O | N | K |
| 6 | B | E | A | C | O | N |
| 12 | C | A | N | A | A | N |
| 18 | C | O | N | N | . | |
| 24 | I | D | A | H | O | |
| 30 | N | E | V | A | D | A |
| 36 | N | E | W | | Y | K |
| 42 | P | O | U | G | H | K |
| 48 | S | W | E | D | E | N |
| 54 | | | | | | |

In the above TABLE, the addressable unit is a character or byte. Note that the symbol ƀ represents a blank byte. There are a total of 54 bytes in the TABLE. The index begins at the relative location 0, and each table entry has 6 bytes. The index for each entry in the table is therefore a multiple of 6. The first byte in each entry is in column 0, and its last byte (ignoring blanks) is in column 4 or 5.

The entry length of 6 addressable units, is not an integral power of 2.

The AND mask for a 6 byte entry length is 0 0 0 0 0 0 1 0.

Register $n$ is initially loaded with 0 0 1 1 0 1 1 0 to represent the 54 A.U. (i.e. bytes) in the TABLE. The search argument is "NEVADA," which can be seen in the TABLE at index 30; but its existence in the TABLE is presumed to be unknown when the search is started, since the TABLE is in computer representation and is therefore not available for human preception.

Initially register B is set to the address of the first A.U. (i.e. first byte) of the first entry of the table. Step 52 in FIG. 4A transfers the contents of register n to register 1, so that register $i$ then contains 0 0 1 1 0 1 1 0, (i.e. 54). Step 53 finds that register i has an odd multiple of 6, and subtracts 6 from register $i$ to provide 0 0 1 1 0 0 0 0, and then divides the number represented in register i by two by right shifting it to obtain 0 0 0 1 1 0 0 0, (i.e. 24). Step 55 uses the index address (i.e. B + 24) to access the table entry "IDAHOƀ" and compare it to the search argument "NEVADA." Since the search argument is found greater than the table entry, step 57 is entered.

In step 57, a new value is generated and placed into register $n$ which is the result of subtracting the value in register i from the value in register $n$. This results in a value of 0 0 0 1 1 1 1 0, (i.e. 30) within register $n$. Also in step 57, the address in register B is adjusted by adding the value in register $i$ to the value in register B. This adjusted value in register B has the address of the first A.U. (i.e. byte) of the table entry "IDAHOƀ".

The portion of the table now remaining to be searched is 30 A.U. long, and the address of the first A.U. of this portion is in register B.

The current number of addressable units in the remaining table portions is the base from which the next index is to be generated. Thus, step 52 then transfers the content of register n to register $i$.

Continuing with step 53, the current value in register $i$ is found to be odd by ANDing 0 0 0 1 1 1 1 0 with the AND mask 0 0 0 0 0 0 1 0, which finds the result is not all zeros, per step 33 in FIG. 2. Accordingly, an adjustment is made by step 34 in FIG. 2 to the value in register $i$, which decreases the value in register $i$ by subtracting 6, and then step 35 in FIG. 2 divides the adjusted content by two by shifting to generate the value 0 0 0 0 1 1 0 0, (i.e. 12) in register $i$.

In FIG. 4A, step 54 finds $i \neq 0$, so that execution continues with step 55, which accesses the next table entry at $B + i$. Register B currently addresses index 30, so that $B + i$ is 30 + 12 to provide 42 as the index of the next entry in the table to be accessed for the comparison by step 55.

The index address 42 accesses the table entry "NEWƀYK". In step 55, the comparison between the search argument "NEVADA" and the table entry "NEWƀYK" determines that the search argument is less than the table entry. Hence execution continues with step 56.

In step 56 the content of register $i$ is transferred to register $n$, so that there are now 12 addressable units in the portion of the table remaining to be searched, and this portion begins at the table index 24, which is the content of register B, which is not changed by step 56.

The process reiterates back to step 53 to examine the remaining table portion. In accordance with the method in FIG. 2, step 53 in FIG. 4A finds the value in register $i$ is an even multiple of 6 (i.e. 0 0 0 0 1 1 0 0) which is ANDed with mask 0 0 0 0 0 0 1 0 to obtain a result which is all zeros. The result is divided by two by right shifting register $i$ to obtain 0 0 0 0 0 1 1 0 (i.e. 6).

Step 54 finds this value is not zero, therefore execution continues with step 55 which accesses the table entry $T_{B+i}$ at index $B+i$, which is 24 + 6 (i.e. 30). Entry "NEVADA" is at index 30. Hence step 55 compares the search argument "NEVADA" with the table entry "NEVADA."

Since the search argument is equal to the table entry, step 57 is entered, where the content in register B is adjusted by adding the value in $i$ to it. Thus register B receives the adjusted value 30. Also in step 57 the number of A.U. remaining in the table is formed in register $n$ by subtracting i from $n$ (i.e. 12 − 6), yielding a value of 6 in register $n$. Then step 52 is reentered and it transfers the content of register $n$ to register $i$, and register $i$ now contains the value 6, (i.e. 0 0 0 0 0 1 1 0). Then 0 0 0 0 0 1 1 0 is ANDed with mask 0 0 0 0 0 0 1 0 to provide 0 0 0 0 0 0 1 0. Register i contains 0 0 0 0 0 1 1 0 after the AND, then, since the AND does not produce all zeros, the value six is subtracted from $i$ to generate a zero result, so that the remainderless division operation in step 53 produces a zero result in register $i$, and step 54 terminates execution of the search with address of the table entry currently addressed in register B.

FIGS. 5 and 6 provide hardware embodiments of the methods in FIGS. 2 and 3, respectively. The reference numbers of the steps in FIG. 2 are shown in FIG. 5 within parenthesis with arrows pointing to the part of the hardware which executes, or indicates the result of execution of the step indicated by the reference number in parenthesis. Thus in FIG. 5, step 32 is performed by the execution of AND gate 62 when it receives the mask $m$ in register 60 and the current number $i$ of addressable units in register 61. AND gate 62 comprises a plurality of AND circuits of well-known configuration. Each AND circuit in gate 62 respectively receives the corresponding bit position outputted from each of registers $m$ and $i$; that is, the first bit position in each of registers $m$ and $i$ provide the inputs to the first AND circuit, the second bit position in each register $m$ and $i$ provides the inputs to the second AND circuit, etc.

An OR circuit 63 receives the outputs from all AND circuits in gate 62 and provides a single output (which may be a single line), which indicates a one signal if any of the AND circuits in gate 62 provides a one output, or a zero signal if all AND circuits provide zero signals. AND gate 64 receives the 0 or 1 signal from OR circuit 63 and also receives signals from the respective bit positions in register 65 which contains the complement of K (i.e. $\overline{K}$) which represents the negative value of the entry length K in computer notation. That is, AND gate 64 comprises a plurality of AND circuits which respectively receive the bit outputs of register 65 as one input and which receive the output of OR circuit 63 as their other input. Also a third input 69*a* to each AND circuit in gate 62 is provided from an iteration clock 69, which enables gate 64 at this time.

AND GATE 64 controls the test function of step 33 in FIG. 2. That is, a zero output from OR circuit 63 indicates all zeros resulted from the $i$ and $m$ operation, and there will not be any output from AND gate 64 to an adder 66, which effectively results in a zero input to that side of the adder. In this case, register 61 outputs its content $i$ to the other side of adder 66 which then provides an output which is the unadjusted value of *i*.

However if OR circuit 63 provides a one signal gates 64 passes the content of register 65 to adder 66 which then provides the adjusted output representing *i–K*.

An iteration clock 69 is provided to coordinate the transfers within the data path shown in FIG. 5 within each iteration of the method in FIG. 2. The transfers described thus far are controlled under the actuation of clock output 69*a* to AND gate 64. However upon the adder operation being completed, the next clock cycle 69*b* is provided to enable an AND gate 68 to pass the output of the adder to register *i*. Immediately thereafter, clock output 69c is provided to shift controls 70 to shift the content in register *i* by one bit position toward its low order end, thereby dropping (i.e. truncating) its lowest order bit, which must have a zero value. Step 35 in FIG. 2 is thereby executed in register 61.

The operation of the method shown in FIG. 2 is thereby completed in the hardware shown in FIG. 5.

The index in register *i* is now ready for use by the binary search method in FIG. 4, i.e. the hardware has executed step 53.

FIG. 6 shows modifications to the hardware in FIG. 5 in order to execute the method illustrated in FIG. 3 which uses an OR mask. The circuits in FIG. 6 replace the hardware in FIG. 5 found between the break lines 71, 72, and 73. After the replacement, OR circuit 62*a* receives the outputs from registers 60 and 61, thereby providing step 32*a* in FIG, 3. Then AND circuit 63*a* receives the outputs of the OR circuits and provides a single output which is zero if any input bit is zero, and is a one if all input bits are ones.

The other portions of the circuit in FIG. 5 operate with the circuitry shown in FIG. 6 in the same manner as previously described for FIG. 5 in order to execute the method illustrated in FIG. 3.

The method shown in FIGS. 2 and 3 can therefore be executed by either hardware or by programming a general purpose computer. The following instruction sequences use the method in FIGS. 2 or 3 on any one of the S/360 or S/370 data processing systems, which is a family of general purpose computers. The different sequences have different relative speeds on the different models of the S/360 and S/370 machines. Other sequences using the same method on the same machines can be done.

INSTRUCTION SEQUENCES FOR AN IBM S/360 COMPUTER

```
                    Sequence 1
 (K = multiple of 4 but ≠ multiple of 8 bytes for S/360)
  LR    TMP,ANDMASK    TABLE DC F'O'
  NR    TMP,i                DC AL4(K)
  S     i,TABLE(TMP)
  SRL   i,1
                    Sequence 2
        (K ≠ multiple of 256 bytes for S/360)
  EX    i,TEST          TEST TM *+1,ORMASK
```

-continued

INSTRUCTION SEQUENCES FOR AN IBM S/360 COMPUTER

```
┌ BC    1,*+6          Branch if tested bit is zero.
│ AR    i,K
│       COMPLEMENT
└→SRL   i,1
                    Sequence 3
            (K = anything for S/360)
  LR    TMP,ANDMASK
  NR    TMP,i
┌ BC    8,*+6
│ AR    i,K COMPLEMENT
└→SRL   i,1
                    Sequence 4
        (K even and ≠ multiple of 16 for S/360)
  EX    i,ARINST
  SRL   i,1             ARINST AR i,j
  The MASK in sequence 4 serves as the R1-R2 field for
the AR instruction. j is a suitably chosen register.
                    Sequence 5
      (K ≠ multiple of 256 but K = multiple of 16)
  EX    i,ARINST        ARINST AR j,i
  SRL   i,1
```

After the execution of any of the above sequences, the content of register *i* contains the index of the next entry to be examined in the remaining table portion, as discussed in relation to FIG. 4.

While the invention has been particularly shown and described with reference to the preferred embodiments thereof, it will be understood by those skilled in the art that the foregoing and other changes in form and detail may be made therein without departing from the spirit and scope of the invention.

What is claimed is:

1. A system for controlling an index register which contains contents in addressable units for accessing a table, comprising index register means for containing a binary field representing the number of addressable units in an entry length in said table, means for providing a mask field identifying the position of the lowest-order 1 bit in said index register, means for signalling a 0 or 1 value of a bit in the index register at a bit position identified by said mask field, and means for adjusting the content of said index register if said bit position tested by said signalling means finds a 1 value, whereby the content of said index register is adjusted for the generation of a next index value.

2. A system as defined in claim 1, further comprising said adjusting means including means for subtracting said binary field from the content of said index register if said signalling means finds a 1 value, and means for shifting the content of the index register by one bit position in the direction of its lowest-order bit position, whereby the content of said index register after said shifting means contains a next index to be accessed in said table.

* * * * *